United States Patent
Brevdo

(10) Patent No.: US 10,956,500 B2
(45) Date of Patent: Mar. 23, 2021

(54) DYNAMIC-LENGTH STATEFUL TENSOR ARRAY

(71) Applicant: Google LLC, Mountain View, CA (US)

(72) Inventor: Eugene Brevdo, San Bruno, CA (US)

(73) Assignee: Google LLC, Mountain View, CA (US)

(*) Notice: Subject to any disclaimer, the term of this patent is extended or adjusted under 35 U.S.C. 154(b) by 924 days.

(21) Appl. No.: 15/410,643

(22) Filed: Jan. 19, 2017

(65) Prior Publication Data
US 2018/0204117 A1    Jul. 19, 2018

(51) Int. Cl.
| | |
|---|---|
| G06F 16/901 | (2019.01) |
| G06F 17/16 | (2006.01) |
| G06N 3/04 | (2006.01) |
| G06N 3/10 | (2006.01) |
| G06N 3/08 | (2006.01) |

(52) U.S. Cl.
CPC .......... *G06F 16/9024* (2019.01); *G06F 17/16* (2013.01); *G06N 3/0445* (2013.01); *G06N 3/084* (2013.01); *G06N 3/105* (2013.01)

(58) Field of Classification Search
CPC ..... G06F 16/9024; G06F 17/16; G06N 3/084; G06N 3/105; G06N 3/0445
See application file for complete search history.

(56) References Cited

FOREIGN PATENT DOCUMENTS

CN    105868917 A    8/2016

OTHER PUBLICATIONS

Abadi, TensorFlow: Large-Scale Machine Learning on Heterogeneous Distributed Systems (Year: 2015).*
Collobert, tensor.md on Github (Year: 2015).*
Morgan, TensorFlow: Shapes and dynamic dimensions (Year: 2016).*
Britz, RNNs in Tensorflow, a Practical Guide and Undocumented Features (Year: 2016).*
Ronan Collobert, Tensor.md (Year: 2015).*
'blog.metaflow.fr' [online] "TensorFlow: Shapes and dynamic dimensions," Morgan. Oct. 13, 2016 [retrieved on Jun. 29, 2018] Retrieved from Internet: URL< https://blog.metaflow.fr/shapes-and-dynamic-dimensions-in-tensorflow-7b1fe79be363> 7 pages.

(Continued)

*Primary Examiner* — Li B. Zhen
*Assistant Examiner* — Tewodros E Mengistu
(74) *Attorney, Agent, or Firm* — Fish & Richardson P.C.

(57) ABSTRACT

Methods, systems, and apparatus, including computer programs encoded on computer storage media, for efficiently processing dynamic length tensors of a machine learning model represented by a computational graph. A program is received that specifies a dynamic, iterative computation that can be performed on input data for processing by a machine learning model. A directed computational graph representing the machine learning model is generated that specifies the dynamic, iterative computation as one or more operations using a tensor array object. Input is received for processing by the machine learning model and the directed computational graph representation of the machine learning model is executed with the received input to obtain output.

20 Claims, 4 Drawing Sheets

(56) References Cited

OTHER PUBLICATIONS

'en.wikipedia.org' [online] "Automatic differentiation," Last update Nov. 10, 215, [retrieved on May 21, 2018] Retrieved from Internet: URL<https://en.wikipedia.org/w/index.php?title=Automatic_differentiation&oldid=690048499> 9 pages.
Abadi et al. "TensorFlow: Large-Scale Machine Learning on Heterogeneous Distributed Systems," arXiv 1603.04467v2, Mar. 16, 2016, 19 pages.
International Search Report and Written Opinion issued in International Application No. PCT/US2018/014349, dated Jun. 13, 2018, 11 pages.
Tokiu et al. "Chainer: a Next-Generation Open Source Framework for Deep Learning," Proceedings of Workshop on Machine Learning Systems, in the $29^{th}$ annual conference on neural information processing systems, vol. 5, Dec. 31, 2015, 6 pages.

* cited by examiner

DYNAMIC-LENGTH STATEFUL TENSOR ARRAY

BACKGROUND

This specification relates to constructing and processing computational graphs that represent machine learning models.

A machine learning model receives input and generates output based on its received input and on values of model parameters. A computational graph representation of a machine learning model defines sequences of operations by the types of operations, the data that is input into and output from each operation, and computational dependencies.

SUMMARY

This specification describes technologies relating to machine learning systems in general, and specifically to systems and methods for efficiently processing dynamic-length tensors of a machine learning model represented by a computational graph.

A computational graph includes nodes, connector edges, and parameter edges. These edges are directed edges. Each node represents a respective computational operation performed. Each connector edge that connects a first node to a second node represents that an output of the operation represented by the first node is an input to the operation represented by the second node.

Each parameter edge represents a flow into a node of one or more parameters of a machine learning model as input to the operation represented by the node. When all inputs required for the operation are available to the node, its operation can be executed.

An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node.

The computational graphs of this specification include nodes that operate on and/or produce what will be referred to as "tensors." A tensor is a multidimensional array of numeric values or other values, e.g., strings, having a specific order that corresponds to the dimensionality of the array. In this specification, the term "tensor" will be used to refer simply to a structure of values that has n dimensions, for n=0, 1, 2, or any larger integer. For example, a scalar value is a 0th-order tensor, a vector of values is a 1st-order or 1D tensor, and a matrix is a 2nd-order or 2D tensor and so on.

In the graph processing system described in this specification, once the operation of a node has used a tensor as an input or produced a tensor as an output, the data of the tensor cannot be changed by another operation. This immutability of tensors allows the system to reason about the computations represented by a graph and to perform various optimizations.

Processing and modifying a computational graph in a distributed manner is described in detail in U.S. Patent Application No. 62/247,709, entitled "PROCESSING COMPUTATIONAL GRAPHS," filed on Oct. 28, 2015, and U.S. Patent Application No. 62/247,713, entitled "MODIFYING COMPUTATIONAL GRAPHS," filed on Oct. 28, 2015. The contents of each are hereby incorporated by reference herein in their entirety.

In general, one innovative aspect of the subject matter described in this specification can be embodied in methods that include the actions of efficiently processing dynamic-length tensors of a machine learning model represented by a computational graph.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. An example method includes: receiving a program specifying a dynamic, iterative computation that can be performed on input data for processing by a machine learning model; generating a directed computational graph representing the machine learning model that specifies the dynamic, iterative computation as one or more operations using a tensor array object, wherein the tensor array object is an object containing a dynamically-sized array of tensors that ensures sequential execution of its operations; receiving an input for processing by the machine learning model; and executing the directed computational graph representation of the machine learning model with the received input to obtain output.

One innovative aspect of the subject matter described in this specification can be embodied in a system comprising one or more computers and one or more storage devices storing instructions that are operable, when executed by the one or more computers to cause the one or more computers to perform operations that implement the example method. One innovative aspect of the subject matter described in this specification can be embodied in one or more non-transitory computer-readable mediums comprising instructions stored thereon that are executable by a processing device and upon such execution cause the processing device to perform operations that implement the example method.

These and other embodiments can optionally include one or more of the following features. The tensor array object can include read, write, concat, split, grad, close, pack, unpack, gather, and scatter operations. The tensor array object can allow data to be written to an index of the tensor array object once. The computational graph including one or more operations using a tensor array object can ensure sequential execution of its operations by defining a tensor flow which is read by all operations of the tensor array object. The write operation can write a flow out tensor that is used to chain write operations so that any write operation ensures that all previous write operations have occurred prior to executing the write operation. A read operation following at least one write operation may use the tensor flow to ensure that all previous write operations have occurred prior to executing the read operation. The computational graph may be augmented to generate a training algorithm that includes computing a gradient of an objective function with respect to each of the parameters of the neural network by inserting a plurality of gradient nodes and training edges into the computational graph to generate a backward path through the computational graph that represents operations for computing the gradients of the objective function with respect to the parameters of the neural network, wherein each gradient node represents a gradient function that computes a gradient of the objective function with respect to parameters flowing along a respective parameter directed edge in the computational graph and training the neural network using the machine learning training algorithm by executing the training computational graph. Augmenting the computational graph may include identifying one or more tensor array operation nodes in the computational graph; and inserting, for each identified tensor array operation node, a corresponding backward path tensor array operation node along the backward path through the computational graph, wherein each backward path tensor array operation node along the backward path through the computational graph, wherein each backward path tensor array operation node forms part of a backward path tensor array object along the backward path corresponding to the tensor array object of the forward path. The one or more tensor array operation nodes may include a write operation, and the backward path tensor array operation corresponding to the write operation may be a tensor array read operation. One or more tensor array operation nodes may include a read operation and the backward path tensor array operation corresponding to the read operation may be a tensor array write operation. Multiple tensor array write operations of the backward path that write to the same index of the backward path tensor array object may be accumulated prior to execution. The machine learning model may be a recurrent neural network. The dynamic, iterative computation that can be performed on input data for processing by a machine learning model is specified within a higher-order operator.

The subject matter described in this specification can be implemented in particular embodiments so as to realize one or more of the following advantages. The dynamic-length tensor arrays and the techniques for using them described in this specification allow for efficient processing of dynamic, iterative computations in a computational graph representation of a machine learning model.

A computational graph can use a tensor array in computations within dynamic flow control loops to allow dynamic allocation of tensor data while maintaining the advantages of tensor immutability. A tensor array supports efficient dynamic, iterative processing by allowing dynamic resizing. As a result, the tensor array can be used to represent not just sequence data, but also tree-like structures and other more complex structures, e.g., graphs and nested data. Iterative computations can then be used to process these structures.

The tensor array also allows lazy execution of operations by ensuring operations occur in sequence using control dependencies. The tensor array also ensures that back propagation calculation occurs correctly by using the control dependencies and intelligent resource management when executing create the back propagation graph.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
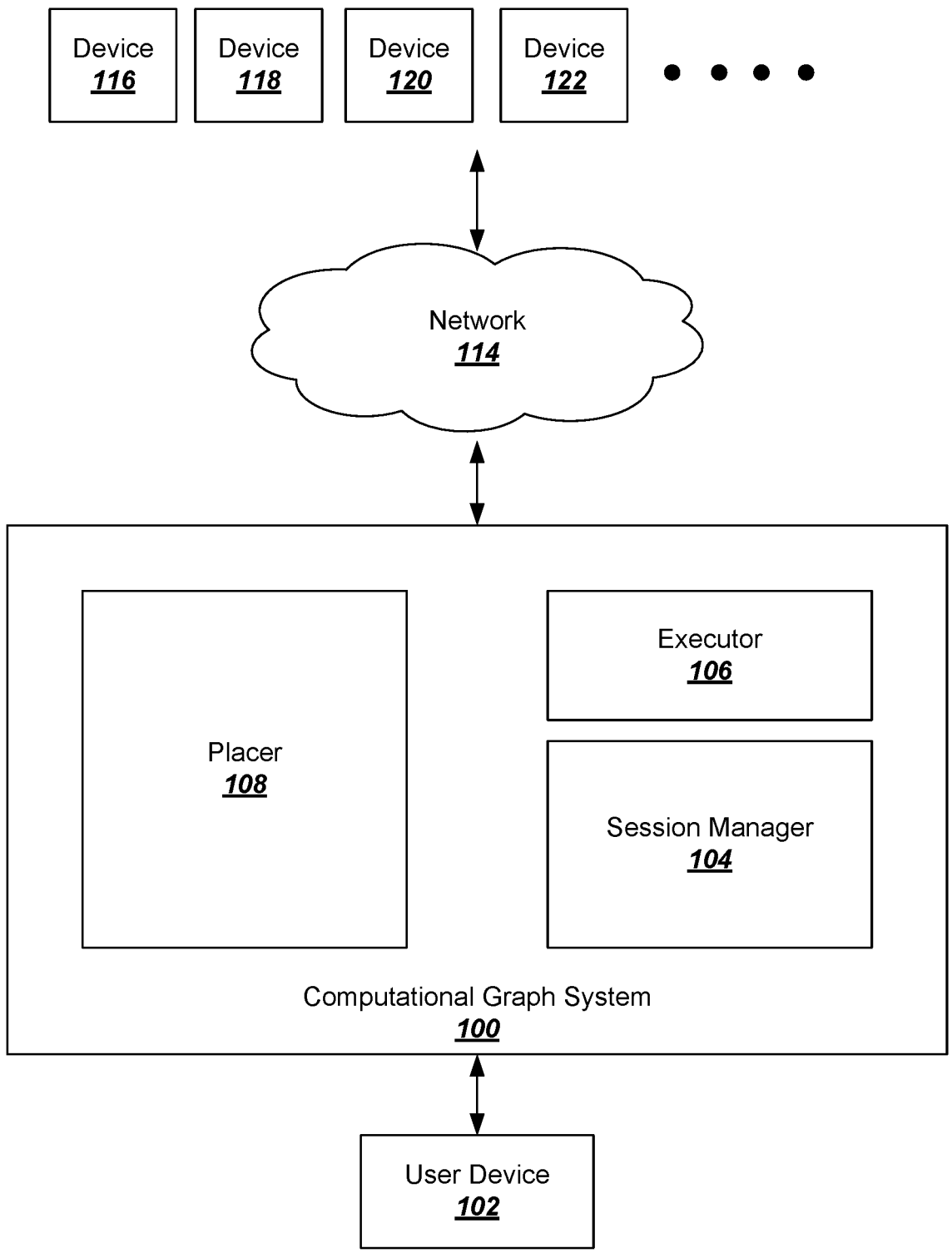
FIG. 1 illustrates an example computational graph system.

This specification generally describes a computational graph system that performs operations represented by a computational graph in a distributed manner. Particularly, this specification describes techniques based on an innovative tensor array object and programming paradigm for efficiently specifying and performing dynamic, iterative computations defined by a computational graph of a machine learning model in both forward and backward propagation.

In this specification, as a convenient shorthand, computations will be described as being performed by nodes of a graph on data flowing through edges of the graph. The reality behind this shorthand is that a graph processing system performs the operations represented by the nodes and provides data from one operation to another according to the flows defined by the directed edges of the graph. The operation represented by a node is performed when the data represented by the one or more edges directed into the node is available. The operation may be performed as soon as the data is available or at a later time determined by the system to satisfy, for example, resource availability or other constraints.

Some computational graphs represent operations that realize a neural network. A neural network is a machine learning model that employs one or more layers of nonlinear units to predict an output for a received input. Some neural networks are deep neural networks that include one or more hidden layers in addition to an output layer. The output of each hidden layer is used as input to another layer in the network, i.e., another hidden layer, the output layer, or both. Some layers of the neural network generate an output from a received input and a respective set of parameters, while other layers of the neural network may not have parameters.

The operations represented by a computational graph may be operations for the neural network to compute an inference, i.e., to process an input through the layers of the neural network to generate a neural network output for the input. Additionally or alternatively, the operations represented by a computational graph may be operations to train the neural network by performing a neural network training procedure to adjust the values of the parameters of the neural network, e.g., to determine trained values of parameters from initial values of the parameters using backpropagation. In some cases, e.g., during training of the neural network, the operations represented by the computational graph can be performed in parallel by multiple replicas of the neural network.

By way of illustration, a neural network layer that receives an input from a previous layer can use a parameter matrix and perform a matrix multiplication between the parameter matrix and the input. In some cases, this matrix multiplication is represented as multiple nodes in the computational graph. For example, a matrix multiplication can be divided into multiple multiplication and addition operations, and each operation can be represented by a different node in the computational graph. The operation represented by each node can generate a respective output, which flows from a node to a subsequent node on the directed edge. After the operation represented by a final node generates a result of the matrix multiplication, the result flows, as represented by a directed edge, to an operation represented by another node. The result in this example corresponds to an output of the neural network layer that performs the matrix multiplication.

In some other cases, the matrix multiplication is represented as one node in the graph. The operation represented by the node can receive, as inputs, an input tensor on a first directed edge and a weight tensor, e.g., a parameter matrix, on a second directed edge. The node can process, e.g., perform a matrix multiplication of, the input and weight tensors to output, on a third directed edge, an output tensor, which is equivalent to an output of the neural network layer.

Other neural network operations that may be represented by nodes in the computational graph include other mathematical operations, e.g., subtraction, division, and gradient computations; array operations, e.g., concatenate, splice, split, or rank; and neural network building block operations, e.g., softmax, sigmoid, rectified linear unit (ReLU), or convolution.

One or more nodes in a computational graph may represent dynamic, iterative control flow operations, e.g., nodes that represent conditional, recursive, and/or iterative control flow statements including: if statements, while loops, do-while loops, for loops, for-each loops, or nested control flow statements that include a combination of these statements.

FIG. 1 illustrates an example computational graph system 100. The system 100 can be implemented as computer programs on one or more computers in one or more locations, in which the systems, components, and techniques described below can be implemented. The system 100 can also be implemented using special purpose hardware for accelerating computations that occur frequently.

The system implements an interface that can be used by a user to request operations be performed on a computational graph. The user can do so using software running on a user device 102, e.g., a web browser or a special purpose application.

As part of the request, the user provides data identifying a computational graph to the system 100 and specifies types of operations, e.g., dynamic, iterative operations, to be performed on the computational graph.

For example, the request can identify a computational graph representing an inference, i.e., a forward propagation computational graph, for a particular neural network and can identify input on which the inference should be performed.

As another example, the request can identify a computational graph, e.g., a backward propagation computation graph, representing a training procedure for a particular neural network and can identify input training data on which the training should be performed.

The system 100 partitions the operations represented by the computational graph across multiple devices 116, 118, 120, 122. The devices 116, 118, 120, 122 perform the operations and, if applicable, return, over a network 114, a respective output or indication to the system 100, which can return the requested output or indication to the user device 102.

Any devices performing machine learning operations, e.g., devices 116, 118, 120, 122, can include a memory, e.g., a random access memory (RAM), for storing instructions and data, and a processor for executing stored instructions. Generally, each device is a hardware resource that performs operations independent of other devices. The devices can be, for example, graphical processing units (GPUs), central processing units (CPUs), processor cores, field programmable gate arrays (FPGAs), or application specific integrated circuits (ASICs) or other machine-learning-specific processors. By way of illustration, one machine can host one or more devices, e.g., multiple CPUs, GPUs, FPGAs, ASICs, or machine-learning-specific processors that are accessible to the computational graph system 100 over a network 114. The devices are advantageously located in one place to reduce data propagation delays.

Figure 2:
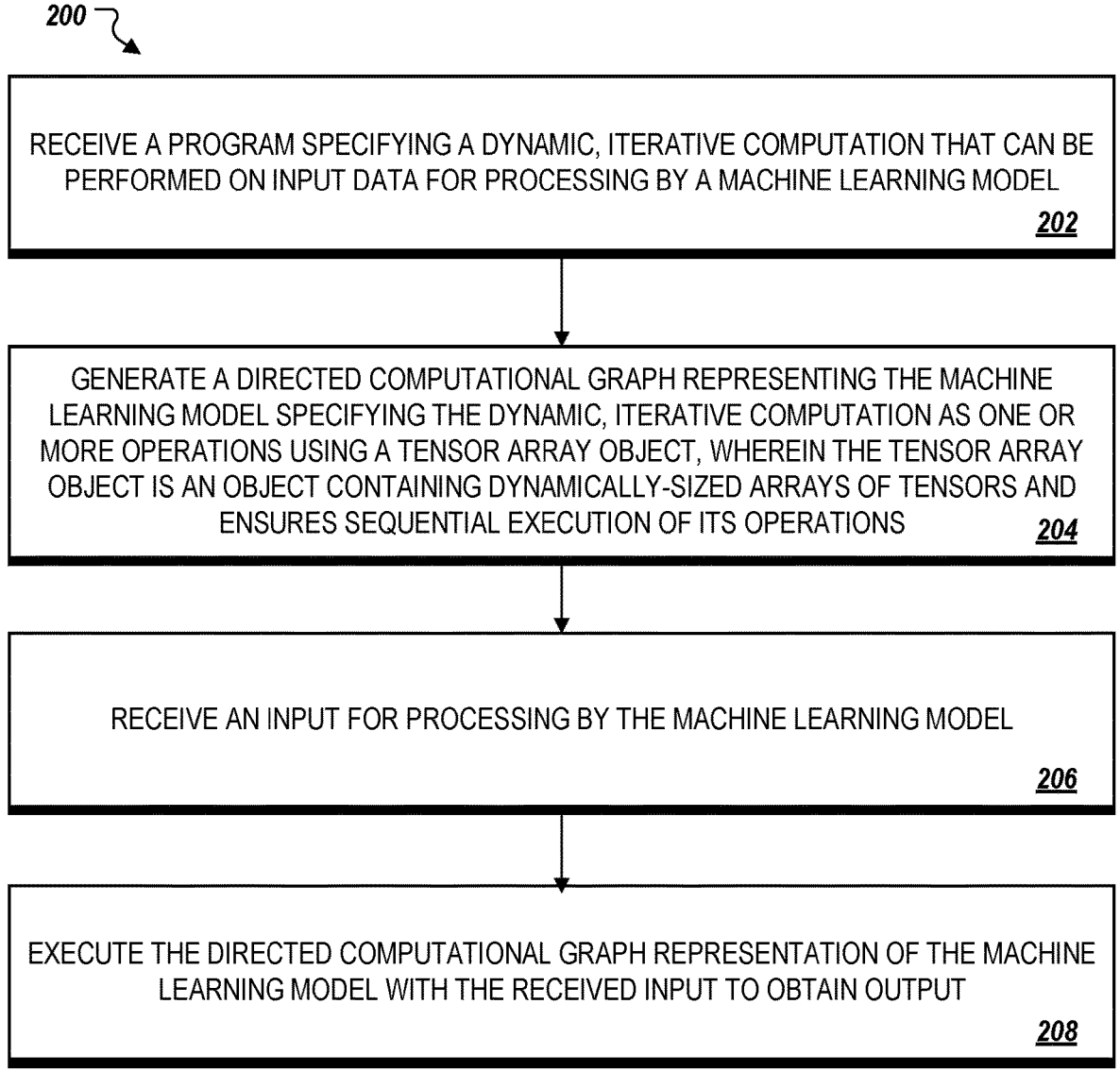
FIG. 2 is a flow diagram of an example process for processing dynamic length tensors in a computational graph that represents a machine learning model.

FIG. 2 is a flow diagram of an example process 200 for performing dynamic length computations, e.g., for-loops or while loops, represented in a computational graph that represents a machine learning model. For convenience, the process 200 will be described as being performed by a system of one or more computers, located in one or more locations, and programmed appropriately in accordance with this specification. For example, an example computational graph system 100 of FIG. 1, appropriately programmed, can perform the process 200. The system receives a program specifying a dynamic, iterative computation that can be performed on input data for processing by a machine learning model 202. The system generates, from the program, an executable directed computational graph representing the machine learning model that specifies the dynamic, iterative computation as one or more operations of a tensor array object 204. To generate the graph, the system generates nodes representing tensor array operations and edges that denote the data dependencies, including control dependencies, between nodes for execution by the system. An example forward computation graph is described in detail with reference to FIG. 3.

The system then receives an input for processing by the machine learning model 206 and performs the computation represented by the generated directed computational graph with the received input to obtain output 208.

TABLE 1

| | |
|---|---|
| 1 | def map_fn(fn, elem): |
| 2 |   if not callable(fn): |
| 3 |     raise TypeError("fn must be callable.") |
| 4 |   n = tf.shape(elem)[0] |
| 5 |   elem_ta = tf.TensorArray(dtype=elem.dtype, size=n) |
| 6 |   elem_ta = elem_ta.unpack(elem) |
| 7 |   result_ta = tf.TensorArray(dtype=elem.dtype, size=n) |
| 8 |   def compute(i, ta): |
| 9 |     out = fn(elem_ta.read(i)) |
| 10 |     ta = ta.write(i, out) |
| 11 |     return (i + 1, ta) |
| 12 |   i_0 = tf.constant(0) |
| 13 |   _, final_result_ta = tf.while_loop( |
| 14 |     lambda i, _: i < n, compute, (i_0, result_ta)) |
| 15 |   results = final_result_ta.pack( ) |
| 16 |   return results |

Table 1 illustrates an example of a map function that uses tensor array operations, i.e., operations of a tensor array object. A tensor array object, which will be referred to simply as a tensor array, is a thread-safe reference counted wrapper and bookkeeping mechanism around a vector of tensor objects. This tensor array object can be dynamically-sized and ensure that its operations are sequentially executed by hidden flow control dependencies. The tensor array object is part of the TensorFlow open source software library for numerical computation using a computational graph and naturally supports back-propagation.

In the map function of Table 1, a map operation applies a function to a sequence of elements in a tensor from the first element to the last element. As illustrated, the example code of Table 1 defines a map function starting on line 1 that takes as input a specific function and a tensor. The map function unpacks the tensor into an input tensor array on line 6 using a tensor array unpack operation. The map function then defines a while loop on line 13 that calls a compute function to perform the compute function on each element of the input tensor within the while loop. The compute function is defined on lines 8-11. The compute function reads an element from an inputted index of the input tensor array and performs a function on the value at line 9 to obtain an output value. The output value is written to a result tensor array object for every element in the input tensor array. Once the while loop has finished, the result tensor array is packed using the tensor array pack operation to provide a tensor as output.

The computational graph system uses tensor array objects for a variety of operations within dynamic loop constructs to support processing of dynamic-length tensors and to perform efficient reads and writes during dynamic iterative calculations.

A tensor array object supports several operations including: size, read, write, unpack, pack, concat, split, grad, and close.

The "size" operation takes in no input and returns the size of the tensor array. Size is the number of tensors that the tensor array object can hold within the data structure. A tensor array object can have its size set at initialization of the tensor array. For example, a tensor array may be initialized by the following code: to =tf.TensorArray (dtype=tf.float32, size=2). As shown, the TensorFlow framework tf initializes a tensor array. This initialization sets the type of tensor data held in the tensor array to float32, meaning that the tensor array holds tensors of floats. Additionally, the tensor array is initialized to a size of 2, meaning that memory has been allocated for two tensors within the tensor array. The tensor array object can dynamically grow past its initial size. However, tensor array objects by default are not dynamically resizable.

The "close" operation takes in no input and closes the tensor array.

The "read" operation takes in an input index, i, and returns the tensor at index i.

The "pack" operation takes the m tensors in the tensor array, assuming they are all have the same shape and stacks them along a new first dimension into a larger tensor.

The "concat" operation takes the m tensors in the tensor array and concatenates them into one tensor, as long as the tensors all match for all dimensions except the first dimension. The operation returns all the tensors in the tensor array concatenated into one tensor.

The "gather" operation receives a set of indices. The indices are identified in a 1D tensor taking values between 0 and the last index of the tensor array. The operation returns the tensors identified by the indices of the tensor array packed into one tensor. This operation in effect is a pack performed on selected tensors rather than all the tensors of a tensor array.

The "write" operation receives an index, i and a tensor T and writes the tensor T at index i in a new tensor array, which is returned as the results of the Write operation. After it is written, this i-th tensor of the tensor array is immutable.

The "unpack" operation receives an input tensor T of size [N, d0, d1, . . . ]. The operation splits the tensor along the first dimension, storing the subtensors at indices 0 . . . N−1.

The "scatter" operation scatters the values of an input tensor in specific indices of a tensor array. The operation receives a tensor T and indices of the tensor array in the form of a 1D tensor with values between 0 and the last index of the tensor array. The operation then unpacks the tensor T into the specified indices.

The "split" operation splits the values of a tensor into the tensor array. The operation receives a tensor T of type dtype to split and a 1D vector that contains the locations to use when splitting the tensor T along its first dimension.

The "grad" operation creates, or performs a lookup to find, a gradient tensor array object, which is a tensor array object that contains the gradient operations for the given forward propagation tensor array object.

At initialization, a tensor array object creates a scalar flow tensor that enforces proper chaining of operations and ensures execution of the operations in order. Each write operation, e.g., write, unpack, and split, requires an input of a scalar flow tensor from the existing tensor array and writes a new flow tensor out that is used by the new tensor array created by the write operation. In the system, the use of a tensor forces the execution of the operation that created it. Thus, when writes are chained together, a write operation uses a flow input tensor to ensure that all previous writes have occurred.

All read operations from a tensor array, e.g., read, pack, and concat, require a scalar flow tensor as input. This scalar flow tensor is part of the encapsulated data of the tensor array object and its use ensures any read following a series of write operations occurs after the execution of the write operations. This use of the flow tensor ensures that any data meant to be written to the tensor array has been written when the read occurs. Since operations require the flow tensor as input, they will not start execution until the flow tensor is available.

Figure 3:
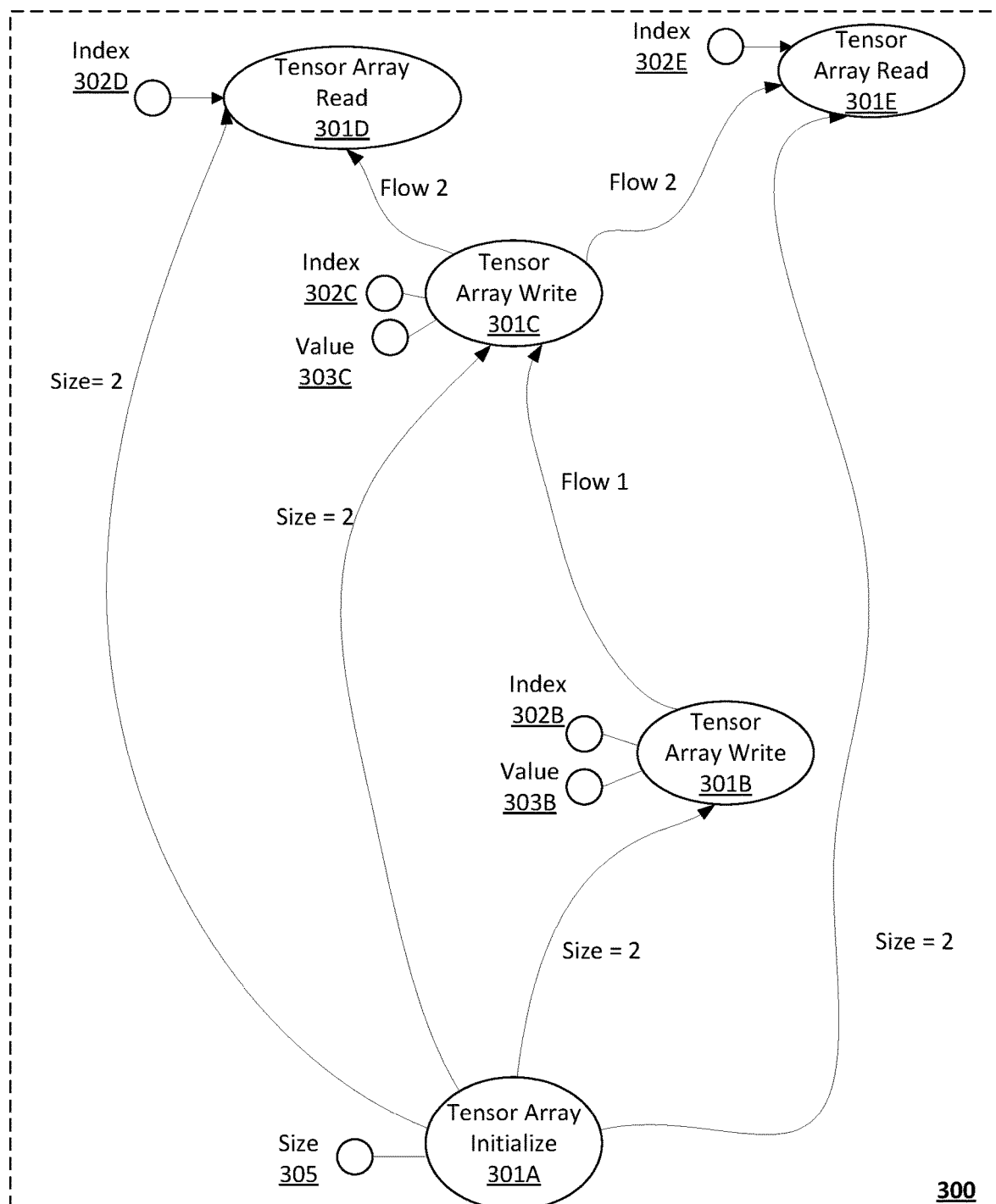
FIG. 3 illustrates an example of a portion of a forward propagation computational graph that uses tensor array object operations.

FIG. 3 illustrates an example of a portion 300 of a forward propagation computational graph that uses tensor array object operations. The example computational graph system 100 of FIG. 1, appropriately programmed, can represent a program 306 as a visual graph, subgraph 300. This subgraph 300 represents the program 306 as an executable directed computational graph. The computational graph system 100 generates a graph that initializes a tensor array object, ta, and performs two tensor array write operations followed by two tensor array read operations as illustrated in the pseudo code snippet of program 306. The computational graph system 100 creates an operation node 301A that represents the initialization of the tensor array, ta. When the tensor array initialize operation node 301A is executed, the node creates a tensor array object, ta, with a size 305, which is specified as an input by the computational graph. In some implementations, the tensor array initialize operation node 301A creates an initial flow tensor to keep track of the flow of operations. In the program 306, the tensor array object, ta, is initialized with a size of two and a tensor data type of float32. The computational graph system 100 then generates an operation node for a first write operation to write c3 into the 0th tensor of the tensor array as specified in the program 306. The tensor array write operation node 301B has an edge from the tensor array initialize operation node 301A that is the size of the tensor array, ta. The tensor array write operation node 301B also takes in an index 302B to be written in the tensor array, a value 303B to write to the index. The tensor array write operation node 301B creates a new tensor array object with the index 302B written and outputs a flow, flow 1, that ensures the write operation occurs before the write of node 301C occurs. In this example, the newlycreated tensor array from the write of the tensor array write operation node 301B is assigned to ta and then used in subsequent operations.

The computational graph system 100 uses a second tensor array write operation node 301C to represent the second write operation of the program 306. The tensor array write operation node 301C has an edge from the node to tensor array write operation node 301B showing that tensor array write operation node 301C has as an input the flow, flow 1, from the tensor array write operation 301B. The tensor array write operation node 301C also takes as an input an index 302C that indicates which tensor is to be written in the tensor array and a value 303C which is the tensor to write.

During execution, the tensor array write operation node 301C performs a write operation to write the value of −3 to the 1st tensor of a tensor array, creating a new tensor array that is subsequently assigned to ta in the example. A new flow, Flow 2, is created by the write operation of the tensor array write operation node 301C and used as input for subsequent operations.

The computational graph system 100 also generates edges and nodes to represent the two tensor array read operations of program 306 and their data dependencies. Each tensor array read operation node 301D, 301E has an edge from the tensor array write operation node 301C to the read node 301D, 301E. These edges represent the data dependency of the read operations. Each of the read operations requires a flow input in order to execute. In operation, the tensor array write operation node 301C outputs flow 2 which is sent as input to tensor array read operation nodes 301D, 301E so that the read operation nodes can perform their read operations. The tensor array read operation nodes 301D, 301E input the index 302D, 302E to be read, which in the program 306 is the 0th and 1st indices, respectively in operation.

The computational graph system 100 uses a gradient tensor array object, grad_r_es, to construct the backpropagation path of the computational graph in order to train the machine learning model. The system may use a machine learning training algorithm that includes computing a gradient of an objective function, e.g., a cost function or a lost function, with respect to each of the parameters of the machine learning model, e.g., as in stochastic gradient descent. In particular, the system generates a backward propagation graph by inserting gradient nodes and training edges into the computational graph to represent operations for computing the gradients of the objective functions with respect to the parameters of the machine learning model. Each gradient node represents a respective gradient function that computes a gradient of the objective function with respect to parameters flowing along a respective parameter edge in the computational graph.

Figure 4:
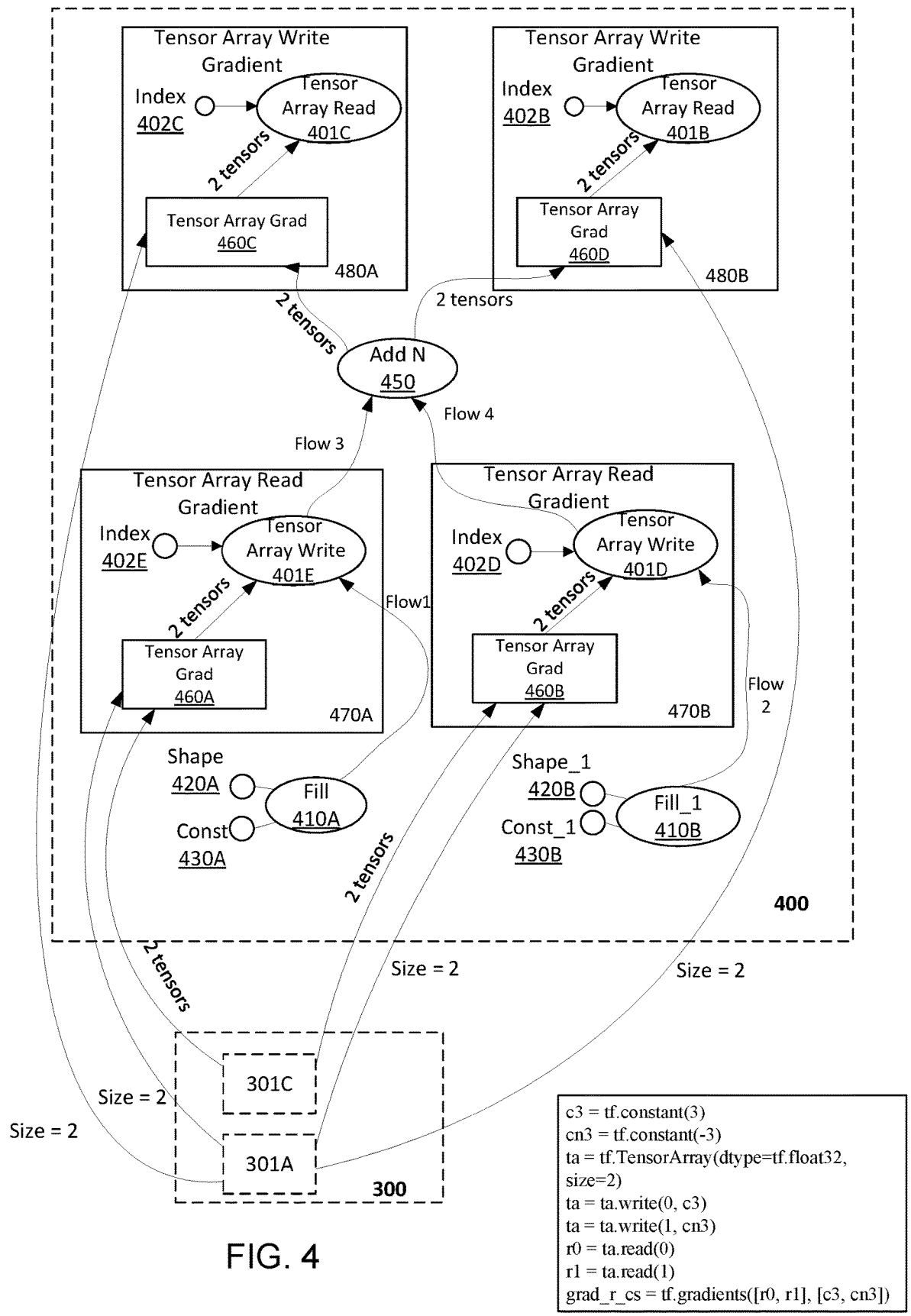
FIG. 4 illustrates an example of a portion of a backward computational graph that represents the backward propagation of the forward propagation computational graph illustrated in FIG. 3.

The example system uses the gradient tensor array object grad_r_cs as illustrated in FIG. 4 to generate a graph that represents gradient computations of a forward tensor array object, e.g., to as illustrated in FIG. 3. The grad operation, defined above, either creates a gradient tensor array object or performs a lookup to find a previously-defined gradient tensor array. Each grad operation takes in a flow input tensor that forces the creation of the gradient tensor array object to occur only after the size of the forward propagating tensor array object is fixed, meaning that all operations of the forward computational graph have been identified. The example system may assume that the gradient tensor execution happens after all forward tensor array operations have executed. The tensor array gradient operation relies on the flow of the forward tensor array. Therefore, the execution of the tensor array gradient operation is dependent on all the forward operations having already executed.

Each operation in the forward propagation tensor array of the computational graph has a corresponding operation in the backward propagation path. For example, a read operation in the forward propagation graph corresponds to a write operation in the backward propagation graph, a pack operation corresponds to an unpack operation, a split operation corresponds to a concat operation, and a scatter operation corresponds to a gather operation.

During forward propagation, tensor arrays have the property that a tensor at any given index may be written only once. This property ensures the source of the write to be able to send the source to the correct gradient tensor during backpropagation. If more than one write occurs, the system does not know what values to pass to the writing operations during backpropagation.

Forward propagation tensor arrays support multiple reads from the same index. Upon backpropagation, the multiple reads become multiple writes and the gradient tensor array is configured to treat multiple writes to the same index as a sum operation using an accumulator. FIG. 4 illustrates an example of a portion of a backward computational graph that represents the backward propagation of the forward propagation computational graph illustrated in FIG. 3. Subgraph 400 is the backward propagation of subgraph 300 from FIG. 3, a portion of which is illustrated in FIG. 4. The example computational graph system 100 of FIG. 1, appropriately programmed, can create the backpropagation subgraph 400 from the forward propagation subgraph 300. The computational graph system 100 generates a graph that initializes a gradient tensor array object, grad_r_cs, and performs gradient operations of the forward propagation graph 300. The computational graph system 100 determines the gradients of the forward graph 300 operations in backward sequential order to form the backward propagation graph 400. Given the forward propagation graph 300, the backward propagation graph will have two read gradient operation nodes 470A, 470B followed by two write gradient operations nodes 480A, 480B.

The computational graph generates a tensor read gradient 470A that contains a tensor array grad operation node 460A that either creates a gradient tensor array object or performs a lookup to find a previously-defined gradient tensor array for the forward propagation graph. The tensor read gradient 470A also contains a tensor array write operation node 401E which is the gradient of the tensor array read operation node 301E. The tensor array grad operation node 460A has one edge from the tensor array write operation node 301C to input the gradient of the output flow of the write operation of the tensor array write operation node 301C and one edge from the tensor array initialize operation node 301A to input the size of the forward propagation graph. The two tensor input illustrated includes a flow tensor for the backpropagation tensor array and the reference object of the backpropagation tensor array.

The tensor array write operation node 401E has input of an index 402E, and a fill node 410A that is filled with the tensor defined by shape 420A and constant 430A to write to the specified index of the gradient tensor array object. The shape 420A creates a tensor of values to send through the back propagation. The tensor array write operation node 401E also takes in as input the gradient of the flow from the tensor array grad operation node 460A. In operation, the tensor array write operation node 401E performs a write operation that outputs a new tensor array object and a flow output, Flow 3.

The computational graph generates a second tensor read gradient 470B that contains a tensor array grad operation node 460B that either creates a gradient tensor array object or performs a lookup to find a previously-defined gradient tensor array for the forward propagation graph. The tensor read gradient 470B also contains a tensor array write operation node 401D which is the gradient of the tensor array read operation node 301D. The tensor array grad operation node 460B has one edge from the tensor array write operation node 301C to input the gradient of the output flow of the write operation of the tensor array write operation node 301C and one edge from the tensor array initialize operation node 301A to input the size of the forward propagation graph. The tensor array write operation node 401D has input of an index 402D and a fill node 410B that is filled with the tensor defined by shape 420B and constant 430B to write into the specified index of the gradient tensor array object. The tensor array write operation node 401D also takes in as input the gradient of the flow from the tensor array grad operation node 460B. In operation, the tensor array write operation node 401D performs a write operation that outputs a new tensor array object and a flow output, Flow 4.

The computational graph system 100 then sets the output of the multiple write operations to run through an accumulator operation node, Add N 450, to ensure that multiple write operations to the same index are accumulated. The flow tensor ensures that the computations 480A and 480B actually occur. Since gradient computations occur across floating point edges, the gradient graph may be constructed only following the flow edges. In this example, the flow ensures that, after the gradients of the two reads execute, the gradients of the two writes are created and execute. Gradient computations occur across floating.

The computational graph system 100 also generates tensor write gradients 480A, 480B to represent the gradients of the two tensor array write operations of the forward propagation graph 300. Each tensor write gradient 480A, 480B contains a tensor array gradient operation node 460C, 460D and a tensor array read operation node 401C, 401B.

The tensor array gradient operation node 460C has an edge from the accumulator operation node 450 that passes the in the gradient flow. The tensor array gradient operation node 460C also has an edge from the tensor array initialize operation node 301A to input the size of the forward propagation graph. The tensor read operation node 401C has an edge from the tensor array gradient operation node 460C that inputs the gradient flow to the operation node. The tensor read operation node also inputs an index 402C on which the operation node performs a read.

The tensor array gradient operation node 460D has an edge from the accumulator operation node 450 that passes in the gradient flow. The tensor array gradient operation node 460D also has an edge from the tensor array initialize operation node 301A to input the size of the forward propagation graph. The tensor read operation node 401B has an edge from the tensor array gradient operation node 460D that inputs the gradient flow to the operation node. The tensor read operation node also inputs an index 402B on which the operation node performs a read.

The example computational graph system uses tensor array objects and operations for a variety of higher order operators, e.g., map, fold left, fold right, and scan. The map function is described above with respect to Table 1.

Fold functions, foldl and foldr, analyze a recursive data structure and through the use of a combining operation and recombines the results to build a return value. These functions use tensor array operations within the combining and recombining loops. The computational graph system can additionally or alternatively use tensor array operations in scan operations. The simplest version of scan repeatedly applies a callable function to a sequence of elements from first to last.

Tensor array objects are useful in line with dynamic loop constructs to support efficient reads and writes during dynamic iterative calculations. These object are especially useful in recurrent neural networks, e.g., neural networks that perform speech-to-text recognition, handwriting recognition, processing and compressing video, or processing text to create parse trees and perform classification on the text. Recurrent neural networks can have input of varying lengths. For example, each sentence that is input into a speech-to-text machine learning model may have a different number of words. In some instances, computations may need to be performed on every word of the sentence. Since sentences can be varying lengths, a computational graph may need to represent computations over every word of a sentence as a computation in a dynamic iterative while loop. These dynamic iterative computations may be represented succinctly and efficiently using tensor array object operations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method comprising: receiving a program specifying a dynamic, iterative computation that can be performed on input data for processing by a machine learning model; generating a directed computational graph representing the machine learning model that specifies the dynamic, iterative computation as one or more operations using a tensor array object, wherein the tensor array object is an object containing a dynamically-sized array of tensors that ensures sequential execution of its operations; receiving an input for processing by the machine learning model; and executing the directed computational graph representation of the machine learning model with the received input to obtain output.

Embodiment 2 is the method of embodiment 1, wherein the tensor array object includes read, write, concat, split, grad, close, pack, unpack, gather, and scatter operations.

Embodiment 3 is the method of embodiment 1 or 2, wherein the tensor array object allows data to be written to an index of the tensor array object once.

Embodiment 4 is the method of any one of embodiments 1-3, wherein the computational graph including one or more operations using a tensor array object ensures sequential execution of its operations by defining a tensor flow which is read by all operations of the tensor array object.

Embodiment 5 is the method of any one of embodiments 1-4, wherein a write operation writes a flow out tensor that is used to chain write operations so that any write operation ensures that all previous write operations have occurred prior to executing the write operation.

Embodiment 6 is the method of embodiment 4, wherein a read operation following at least one write operation uses the tensor flow to ensure that all previous write operations have occurred prior to executing the read operation.

Embodiment 7 is the method of any one of embodiments 1-6, further comprising: augmenting the computational graph to generate a training computational graph for training the neural network using a machine learning training algorithm that includes computing a gradient of an objective function with respect to each of the parameters of the neural network, comprising: inserting a plurality of gradient nodes and training edges into the computational graph to generate a backward path through the computational graph that represents operations for computing the gradients of the objective function with respect to the parameters of the neural network, wherein each gradient node represents a gradient function that computes a gradient of the objective function with respect to parameters flowing along a respective parameter directed edge in the computational graph; and training the neural network using the machine learning training algorithm by executing the training computational graph.

Embodiment 8 is the method of embodiment 7, wherein augmenting the computational graph further comprises: identifying one or more tensor array operation nodes in the computational graph; and inserting, for each identified tensor array node, a corresponding backward path tensor array operation node along the backward path through the computational graph, wherein each backward path tensor array operation node forms part of a backward path tensor array object along the backward path corresponding to the tensor array object of the forward path.

Embodiment 9 is the method of embodiment 8, wherein the one or more tensor array operation nodes include a write operation, and wherein the backward path tensor array operation corresponding to the write operation is a tensor array read operation.

Embodiment 10 is the method of embodiment 8 or 9, wherein the one or more tensor array operation nodes include a read operation, and wherein the backward path tensor array operation corresponding to the read operation is a tensor array write operation.

Embodiment 11 is the method of embodiment 9, wherein multiple tensor array write operations of the backward path that write to the same index of the backward path tensor array object are accumulated prior to execution.

Embodiment 12 is the method of any of embodiments 1-11, wherein the machine learning model is a recurrent neural network.

Embodiment 13 is the method of any of embodiments 1-12, wherein the dynamic, iterative, computation that can be performed on input data for processing by a machine learning model is specified within a higher-order operator.

Embodiment 14 is a system of one or more computers and one or more storage devices storing instructions that are operable, when executed by the one or more computers to cause the one or more computers to perform the operations of any one of the embodiments 1 through 13.

Embodiment 15 is one or more non-transitory computer-readable storage mediums comprising instructions stored thereon that are executable by a processing device and upon such execution cause the processing device to perform the operations of any one of the embodiments 1 through 13.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    receiving a program specifying a dynamic, iterative computation that can be performed on input data for processing by a machine learning model;
    generating a directed computational graph representing the machine learning model that specifies the dynamic, iterative computation as a plurality of operations using a tensor array object, wherein:
        the tensor array object is a data structure that comprises a dynamically-sized array of a plurality of immutable tensors as a result of executing the plurality of operations of the dynamic, iterative computation, and
        each of the plurality of immutable tensors of the tensor array object represent i) a respective hidden flow control dependency of an input immutable tensor if the input immutable tensor had been modified in response to executing a corresponding subset of the plurality of operations and ii) use the respective hidden flow control dependency of the input immutable tensor to ensure that control flow dependency is maintained;
    receiving an input for processing by the machine learning model; and
    executing the directed computational graph of the machine learning model with the received input to obtain output using the plurality of immutable tensors that each ensure, using the respective hidden flow control dependency of an input immutable tensor, that control flow dependency is maintained.

2. The computer-implemented method of claim 1, wherein the plurality of operations specified by the tensor array object comprise one or more of: read, write, concat, split, grad, close, pack, unpack, gather, and scatter operations.

3. The computer-implemented method of claim 1, wherein executing the directed computational graph comprises performing a forward propagation of the received input to the machine learning model, comprising:

performing no more than one write operation for each immutable tensor of the plurality of immutable tensors of the tensor array object to write data to the immutable tensor; and performing one or more read operations to read data from any immutable tensor of the plurality of immutable tensors of the tensor array object.

4. The computer-implemented method of claim 1,
wherein the plurality of operations define a directed sequence, and
wherein the plurality of operations comprise a write operation that writes a respective immutable tensor only after every write operation in the plurality of operations occurring before the write operation in the directed sequence has executed prior to executing the write operation.

5. The computer-implemented method of claim 1,
wherein the plurality of operations define a sequence, and
wherein the plurality of operations comprise a read operation that reads a respective immutable tensor only after any write operation occurring before the read operation in the defined sequence has executed.

6. The computer-implemented method of claim 1, further comprising:
augmenting the directed computational graph to generate a training computational graph for training neural network using a machine learning training algorithm that includes computing a gradient of an objective function with respect to each of the parameters of the neural network, comprising:
inserting a plurality of gradient nodes and training edges into the directed computational graph to generate a backward path through the directed computational graph that represents operations for computing the gradients of the objective function with respect to the parameters of the neural network, wherein each gradient node represents a gradient function that computes a gradient of the objective function with respect to parameters flowing along a respective parameter-directed edge in the directed computational graph; and
training the neural network using the machine learning training algorithm by executing the training computational graph.

7. The method of claim 6, wherein augmenting the directed computational graph further comprises:
identifying one or more tensor array operation nodes in the directed computational graph; and
inserting, for each identified tensor array operation node, a corresponding backward path tensor array operation node along the backward path through the directed computational graph, wherein each backward path tensor array operation node forms part of a backward path tensor array object along the backward path corresponding to the tensor array object of the forward path.

8. The method of claim 7, wherein the one or more tensor array operation nodes include a write operation, and wherein the backward path tensor array operation corresponding to the write operation is a tensor array read operation.

9. The method of claim 7, wherein the one or more tensor array operation nodes include a read operation, and wherein the backward path tensor array operation corresponding to the read operation is a tensor array write operation.

10. The method of claim 8, wherein multiple tensor array write operations of the backward path that write to the same index of the backward path tensor array object are accumulated prior to execution.

11. The method of claim 1, wherein the machine learning model is a recurrent neural network.

12. The method of claim 1, wherein the dynamic, iterative computation that can be performed on input data for processing by a machine learning model is specified within a higher-order operator.

13. A system comprising:
one or more computers; and
one or more storage devices storing instructions that are operable, when executed by one or more computers, to cause the one or more computers to perform operations comprising:
receiving a program specifying a dynamic, iterative computation that can be performed on input data for processing by a machine learning model;
generating a directed computational graph representing the machine learning model that specifies the dynamic, iterative computation as a plurality of operations using a tensor array object, wherein:
the tensor array object is a data structure that comprises a dynamically-sized array of a plurality of immutable tensors as a result of executing the plurality of operations of the dynamic, iterative computation, and
each of the plurality of immutable tensors of the tensor array object represent i) a respective hidden flow control dependency of an input immutable tensor if the input immutable tensor had been modified in response to executing a corresponding subset of the plurality of operations and ii) use the respective hidden flow control dependency of the input immutable tensor to ensure that control flow dependency is maintained;
receiving an input for processing by the machine learning model; and
executing the directed computational graph of the machine learning model with the received input to obtain output using the plurality of immutable tensors that each ensure, using the respective hidden flow control dependency of an input immutable tensor, that control flow dependency is maintained.

14. The system of claim 13, wherein the plurality of operations comprise one or more of read, write, concat, split, grad, close, pack, unpack, gather, and scatter operations.

15. The system of claim 13, wherein executing the directed computational graph comprises performing a forward propagation of the received input to the machine learning model, comprising:
performing no more than one write operation for each immutable tensor of the plurality of immutable tensors of the tensor array object to write data to the immutable tensor; and
performing one or more read operations to read data from any immutable tensor of the plurality of immutable tensors of the tensor array object.

16. The system of claim 13,
wherein the plurality of operations define a directed sequence,
wherein the plurality of operations comprise a write operation that writes a respective immutable tensor only after every write operation in the plurality of operations occurring before the write operation in the directed sequence has executed prior to executing the write operation.

17. The system of claim 13,
wherein the plurality of operations define a sequence, and
wherein the plurality of operations comprise a read operation that reads a respective immutable tensor only after any write operation occurring before the read operation in the defined sequence has executed.

18. The system of claim 13, wherein the operations further comprise:
augmenting the directed computational graph to generate a training computational graph for training neural network using a machine learning training algorithm that includes computing a gradient of an objective function with respect to each of the parameters of the neural network, comprising:
inserting a plurality of gradient nodes and training edges into the directed computational graph to generate a backward path through the directed computational graph that represents operations for computing the gradients of the objective function with respect to the parameters of the neural network, wherein each gradient node represents a gradient function that computes a gradient of the objective function with respect to parameters flowing along a respective parameter-directed edge in the directed computational graph; and
training the neural network using the machine learning training algorithm by executing the training computational graph.

19. One or more non-transitory computer-readable storage mediums comprising instructions stored thereon that are executable by a processing device and upon such execution cause the processing device to perform operations comprising:
receiving a program specifying a dynamic, iterative computation that can be performed on input data for processing by a machine learning model;
generating a directed computational graph representing the machine learning model that specifies the dynamic, iterative computation as a plurality of operations using a tensor array object, wherein:
the tensor array object is a data structure that comprises a dynamically-sized array of a plurality of immutable tensors as a result of executing the plurality of operations of the dynamic, iterative computation, and
each of the plurality of immutable tensors of the tensor array object represent i) a respective hidden flow control dependency of an input immutable tensor if the input immutable tensor had been modified in response to executing a corresponding subset of the plurality of operations and ii) use the respective hidden flow control dependency of the input immutable tensor to ensure that control flow dependency is maintained;
receiving an input for processing by the machine learning model; and
executing the directed computational graph of the machine learning model with the received input to obtain output using the plurality of immutable tensors that each ensure, using the respective hidden flow control dependency of an input immutable tensor, that control flow dependency is maintained.

20. The one or more computer-readable storage mediums of claim 19, wherein executing the directed computational graph comprises performing a forward propagation of the received input to the machine learning model, comprising:
performing no more than one write operation for each immutable tensor of the plurality of immutable tensors of the tensor array object to write data to the immutable tensor; and
performing one or more read operations to read data from any immutable tensor of the plurality of immutable tensors of the tensor array object.

* * * * *

UNITED STATES PATENT AND TRADEMARK OFFICE
CERTIFICATE OF CORRECTION

| | | |
|---|---|---|
| PATENT NO. | : 10,956,500 B2 | Page 1 of 1 |
| APPLICATION NO. | : 15/410643 | |
| DATED | : March 23, 2021 | |
| INVENTOR(S) | : Brevdo | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this
Eleventh Day of October, 2022

*Katherine Kelly Vidal*

Katherine Kelly Vidal
*Director of the United States Patent and Trademark Office*